Figure 1:
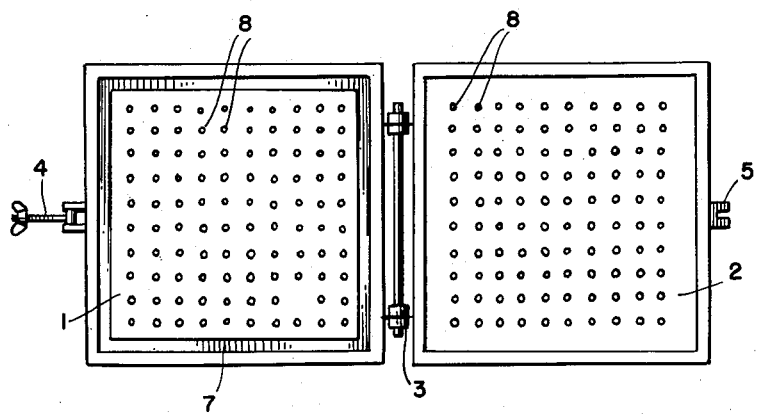

May 8, 1956

F. STASNY ET AL 2,744,291

PRODUCTION OF POROUS SHAPED ARTICLES
FROM THERMOPLASTIC MATERIALS
Filed April 16, 1952

INVENTORS:
FRITZ STASTNY
KARL BUCHHOLZ
BY Margace, Johnston, Cook
& Root
ATT'YS

United States Patent Office 2,744,291
Patented May 8, 1956

2,744,291

PRODUCTION OF POROUS SHAPED ARTICLES FROM THERMOPLASTIC MATERIALS

Fritz Stastny, Weinheim an der Bergstrasse, and Karl Buchholz, Ludwigshafen (Rhine), Germany, assignors to Badische Anilin- & Soda-Fabrik Aktiengesellschaft, Ludwigshafen (Rhine), Germany Application April 16, 1952, Serial No. 282,681

Claims priority, application Germany April 19, 1951

11 Claims. (Cl. 18—48)

This invention relates to a process for the production of porous shaped articles from thermoplastic materials.

In the copending application Ser. No. 212,676, filed February 24, 1951, which matured into U. S. Patent 2,681,321, by Fritz Stastny, one of the inventors of the present application, and Rudolf Gaeth, there has been disclosed a process for the production of porous masses from thermoplastic materials according to which volatile liquids which do not dissolve or only swell the thermoplastic materials are added to monomeric polymerizable substances or to solutions of high-polymeric substances in monomeric substances and the polymerization of the monomers is carried out at temperatures below the boiling point of the added liquid. The resulting liquid-containing thermoplastic material is then foamed-up by heating to temperatures above the boiling point of the non-polymerizable liquid employed.

By this process it is possible to convert compact articles of thermoplastic materials into porous articles having about three times the original volume while retaining their shape. Thus for example from circular discs which have been sawn off from a cylindrically shaped polymer containing the raising agent, highly porous foam-like discs are obtained. The formation of another shape during the foaming-up process is only possible to an insufficient extent and requires the carrying out of further working operations.

We have now found that porous shaped articles of especially good proportion-retentivity, of any shape and of any size can be obtained from synthetic thermoplastic substances by heating finely-grained thermoplastic substances, advantageously of a particle size of 0.5 to 5.0 millimetres, which contain non-dissolving or only swelling organic volatile liquids in homogeneous dispersion therein in closed moulds to temperatures above the boiling point of the liquids until the thermoplastic material has softened. As a rule less than 10% of the moulds used for the production of the shaped articles is filled with the comminuted thermoplastic material containing the liquid raising agent and the residual volume of the mould is filled up by the foaming up of the thermoplastic substance. Suitable organic volatile liquids which may be employed are for example for polystyrene volatile hydrocarbons such as petrol ether having a boiling range from 30° C. to 70° C., further pentane, hexane, heptane, cyclopentane, cyclohexane and cyclopentadiene.

It is surprising that by the said process the individual particles of thermoplastic substance can unite together during the foaming-up process to form homogeneous shaped articles without previous pressing. In order to prepare the particles of thermoplastic substance to be employed, masses of thermoplastic materials which already contain the non-dissolving or only swelling liquids can be comminuted, for example in cross-beater mills. The thermoplastic material which is already present in a comminuted form may, however, also be immersed for a long time in the non-dissolving or only swelling liquids. In order to accelerate the penetration of the said liquids it is preferable to add to these liquids a solvent for the thermoplastic material and if necessary to employ elevated temperatures for the treatment of the thermoplastic material. In this case, however, care must be taken that the proportion of the non-dissolving liquid is appropriately high in order to prevent agglomeration of the particles of thermoplastic substance. The proportions must be adapted to the specific properties of the thermoplastic substance in question. When employing comminuted polystyrene, for example, it is advantageous to carry out the immersion in a mixture which contains more than 30%, preferably about 85%, of non-dissolving liquid. The introduction of the non-solvent or swelling liquid into the thermoplastic substance may also be carried out by treating the thermoplastic substance, if desired in a comminuted state, with an excess of non-solvent or swelling liquid, preferably with an addition of readily volatile solvents, whereby a compact mass is obtained. The thermoplastic substance absorbs, especially after long immersion in the liquids, more raising agent than is necessary for the formation of a porous article. By rolling the mass on mixing rollers at a relatively low temperature a part of the excess liquid can be removed again. The rolling process is interrupted when the thermoplastic substance has the necessary liquid content, for example about 6% of petroleum ether in the case of polystyrene, the rolled foil is comminuted to injection moulding grain size and this comminuted material used for the production of porous shaped articles. A further possibility for the production of the particles of thermoplastic substance containing non-solvent or swelling liquids in homogeneous dispersion is offered by special modifications of bead and emulsion polymerization in which non-solvent or swelling liquids are polymerized into the particles of thermoplastic substance. The process is capable of employment for example in the bead polymerization of styrene and acrylic esters; if desired, interpolymerizations may also be carried out.

By the said process it is possible, for example, to prepare porous plates about 2 metres long and 20 centimetres thick or cylindrical bodies of any height and diameter or refrigerator casings or the like. It is also possible, however, to produce in one working operation smaller shaped articles, as for example balls, cushions, swimming belts, packing discs, pots, shoe soles, parts of boats, helmet-like articles, rings, dolls, floating animals, fish, star-shaped Christmas tree ornaments and the like. The production of the porous shaped articles may also be carried out by injection moulding methods, in spraying machines, in vulcanizing presses or by the introduction of the heated foamed-up masses into cold moulds.

The foaming-up of the liquid-containing particles of thermoplastic substance may be effected by heating with hot air, with moist hot air, with steam, preferably at 100° C. to 300° C., by infra-red radiation, in electric high frequency fields or by contact with hot liquids which do not dissolve the thermoplastic substances such as water, ethylene glycol and glycerine. There is charged into the mould which is closed on all sides such an amount of liquid-containing thermoplastic substance that upon foaming-up it completely fills the same and exerts an excess pressure on the inner walls of the mould on all sides, whereby a homogeneous welding together of the foamed-up particles of thermoplastic substance is ensured. When steam is used for the foaming-up of the thermoplastic susbtance, it is blown into the moulds through appropriate apertures.

The foamed-up material may be employed as a substitute for cork, for example as an insulating material against cold, heat or sound, as a filling material, for example between wood and metal plates, as an insulating material in the electrical industries, for example in the form of bands, or as distance pieces between electrical conductors, for the production of parts of aircraft, car bodies and boats, as damping substrates, for example for writing machines, as table supports, floor coverings, wall coverings, as damping layers for floor coverings, for example of linoleum, and the like.

When a specially high elasticity of the foamed-up material is desired, this can be attained, as in the case of cork, by compression, i. e. by pressing together the mass for example in cold presses or by passage between closely arranged rollers.

For the preparation of the porous shaped articles there may be co-employed with the non-foamed-up granular material, also comminuted already foamed-up material, which has been obtained for example as waste, and this is of special importance in practice. During the foaming-up process there takes place an intimate union between the comminuted already foamed-up waste and the newly-formed porous thermoplastic mass.

In the production of the foamed-up articles a great variety of additional substances may be incorporated with the non-foamed-up grains of thermoplastic substance, as for example dyestuffs, softening agents, comminuted fibres, incombustible substances which yield incombustible gases upon burning, such as urea, diammonium phosphate, borates, polyvinyl chloride powder and the like, rubber powder, and asbestos fibres. By employing additions which yield nitrogen, carbon dioxide, chlorine or other incombustible gases upon burning, it is possible to reduce the combustibility of the porous shaped articles considerably so that they are no longer inflammable.

The following examples will further illustrate this invention but the invention is not restricted to these examples. The parts are by weight.

*Example 1*

300 parts of polystyrene are dissolved in 600 parts of monostyrene and, while stirring well, there are added to the solution 60 parts of petroleum ether of the boiling range 45° C. to 50° C. and 8 parts of benzoyl peroxide. The mass is stored for 30 days at 32° C., a homogeneous solid article thus being formed. It is ground in a cross-beater mill, after previous coarse comminution, and a grain size corresponding to the granules usually employed in injection moulding is obtained. The particle size of the comminuted particles varies between 0.1 and 5 millimetres.

2900 grams of the comminuted mass are introduced into a cylindrical hollow metal mould having a diameter of 30 centimetres and a height of 40 centimetres which is provided at suitable places with perforations, the mould is firmly closed and immersed for 35 minutes in water at 95° C. Care is taken that the mould remains constantly under water and its position is changed a few times. After removal from the water bath, the mould is cooled with cold water. A foamed-up cylindrical article is obtained which has a specific gravity of 0.09 and has a homogeneous fine pore distribution. It is cut up into discs 5 centimetres in thickness. The discs may be cut up into endless bands which can be employed for insulating purposes in the electrical industry. The discs may also be used, however, as cushion material, as an insulating material against cold, heat and sound, as shoe inserts, as a cork substitute, as a light building material and the like. Articles of various shapes, as for example rings, hemispheres, and other shaped articles may also be produced from the cylindrical block by sawing, cutting or boring at suitable places.

*Example 2*

35 parts of polystyrene are dissolved in 650 parts of monostyrene and, while stirring well, 70 parts of petroleum ether having the boiling range 50° C. to 55° C. and 8 parts of tertiary-butyl perbenzoate are added to the solution. The resulting homogeneous mass is stirred for 28 days at 30° C., a transparent solid article being thus formed. It is comminuted to injection moulding grain size. 4800 grams thereof are introduced into a metal mould 98 centimetres long, 49 centimetres wide and 10 centimetres high which is provided with small perforations at suitable places, the mould is closed and stored for 4 hours at 105° C. in air containing steam. A uniform porous shaped article is formed which has the same dimensions as the metal mould and a specific gravity of 0.09. It may be used as an insulating plate against cold and sound and, after appropriate shaping by cutting, for the construction of scenery, decorations, animal figures, furniture, table plates and the like. In a similar manner the polystyrene granules may be built up in any other closed moulds, also by foaming-up in water, glycerine, if desired under excess pressure, by infra-red radiation at temperatures between 85° C. and 130° C., to form porous shaped articles having a specific gravity of 0.04 to 0.2 depending on the amount of polystyrene grains as compared with the volume to be filled.

The regulation of the desired specific gravity may also be carried out by first effecting the formation of the porous article in a closed mould to a specific gravity which is relatively high, as for example 0.1. After removal from this mould, the porous shaped article can be heated again to a temperature above the softening point either in a larger mould or without a mould, whereupon it becomes larger and specifically lighter.

*Example 3*

1000 parts of comminuted polystyrene having a grain size of about 1 to 2 millimetres is stored for 6 weeks in a mixture of 1800 parts of methanol and 60 parts of petroleum ether of the boiling range 45° C. to 50° C., the whole being stirred thoroughly from time to time. The excess liquid is then filtered off and the granules of thermoplastic substance stored for 3 hours in the air at 20° C. The polystyrene granules are then introduced into a closed, perforated metal mould and stored in water at 95° C. and thereby converted into a porous shaped article having a specific gravity of 0.09. This may be used as a cork substitute, for example as intermediate soles for ladies' shoes.

When the comminuted polystyrene is treated at higher temperatures, as for example at 60° C., with the liquid mixture with the employment of closed vessels, the storage time necessary to effect penetration of the liquids can be considerably shortened.

*Example 4*

350 parts of polystyrene are dissolved in 650 parts of monostyrene and, while stirring vigorously, 60 parts of pentane, 8 parts of the peroxide of cyclohexanone and 0.2 part of cobalt naphthenate are added to the solution. After standing for 30 days at 23° C., the mass yields a homogeneous solid article which is then comminuted. 750 grams of the granular mass is charged into a metal container having a volumetric capacity of 10 litres with an addition of 250 grams of comminuted waste of foamed-up polystyrene. The metal container is provided with perforations at a few suitable places and is capable of being closed tightly. The closed mould is stored in a waterbath at 92° C. and then cooled to room temperature. From the resulting porous shaped article, plates or bands are cut and stuck together by means of a solution of 9 parts of degraded natural rubber in 81 parts of petroleum ether of the boiling range 52° C. to 57° C. in such a manner that a box-like structure is formed, which is suitable for example as an insertion in refrigerators. Articles of other shapes may be prepared from the block material by sawing or turning, as for example spherical parts which may be employed as fishing floats.

Plates from the porous block material may be subsequently deformed at temperatures of 70° C. to 80° C., for example for the production of arched sections for swimming belts.

Comminuted waste of foamed-up plates can be used as additional materials to a great variety of materials, as for example to cork meal in the production of pressed cork blocks, to light materials of various kinds, as fillers in mixtures of natural or synthetic rubber and in mixtures of thermoplastic substances of a great variety of kinds. The comminuted foamed-up material may also be used alone for the production of plates with the addition of various binding agents, as for example the abovementioned adhesive solution or latex or dispersions of synthetic rubber, other thermoplastic material dispersions, solutions of thermoplastic substances, mixtures of solvents and the like.

*Example 5*

400 parts of polystyrene are dissolved in 600 parts of monostyrene and to the solution there are added, while stirring well, 70 parts of petroleum ether of the boiling range 45° C. to 50° C. and 6 parts of benzoyl peroxide. The mass is introduced into a cylindrical, slightly conical mould provided at the top and bottom with cap-like closures capable of being screwed on. One of the closures is provided with a valve cock. The mould is filled to about ¾ of its capacity with the said mass, the valve cock being at the top. The mass remains in the mould for 7 days at 30° C. After this time, nitrogen under a pressure of 5 atmospheres is pressed in through the valve cock. After storage for 20 days at 35° C., a homogeneous solid article is obtained which is comminuted as described in Example 1. 150 parts of the comminuted mass of synthetic substance are ground with 100 parts of urea in a ball mill for 48 hours and then kept for 10 minutes in a mould of 1600 cubic centimetres capacity in a steam atmosphere at 110° C. A porous shaped article is formed which after being lit ceases to burn when the open flame is removed.

*Example 6*

A mixture of 1800 parts of petroleum ether of the boiling range 60° C. to 65° C. and 200 parts of methylene chloride is poured over 900 parts of granular polystyrene and stored for 24 hours at room temperature. A compact soft mass is formed which is rolled on mixing rollers at 58° C. for 15 minutes. The rolled foil is cooled and ground to injection moulding grain size and the comminuted material employed for the production of shaped articles.

*Example 7*

A mixture of 500 parts of monostyrene, 12.5 parts of benzoyl peroxide and 40 parts of petroleum ether of the boiling range 52° C. to 57° C. is added to 1000 parts of water and 2.5 parts of polyvinyl pyrrolidone in a stirring vessel and polymerized under reflux for 60 hours at 50° C. while stirring continuously. A bead polymer is obtained having a bead diameter of about 1 to 2 millimetres. The polymer is filtered off, washed with water and freed from adherent water. 40 grams of the bead polymer are charged into a doll mould having a volume of about 400 cubic centimetres and the closed doll mould, which is provided with perforations at a few places, is laid in water at 95° C. for 25 minutes. A doll of porous polystyrene of a white color is obtained which can be lacquered in any desired manner. During lacquering care must be taken that the lacquer should preferably not contain any solvent for polystyrene.

*Example 8*

350 parts of polystyrene are dissolved in 650 parts of monostyrene and to the resulting solution there are added, while stirring well, 65 parts of petroleum ether of the boiling range 60° C. to 65° C. and 8 parts of benzoyl peroxide. The mass is stored first for 14 days at 22° C. and then for 14 days at 40° C., a homogeneous solid article thus being formed. The solid article is comminuted in a cross-beater mill to a grain size of about 1 to 5 millimetres. The comminuted material is employed for spraying round a wire of 1.2 millimetres thickness with the conventional spraying machine for thermoplastic substances, care being taken that during the spraying process the comminuted mass is brought into water at 95° or into steam at 110° C. There is formed on the wire a complete covering of porous polystyrene which is pressed on to the wire upon leaving the spraying nozzle by means of a sleeve-like compressible member, cooling being effected simultaneously. The wire thus acquires a high quality electrical insulation having good mechanical properties.

*Example 9*

50 parts of comminuted polystyrene are dipped for 10 seconds into a mixture of 80 parts of petroleum ether having the boiling range 52° C. to 57° C. and 20 parts of methylene chloride and then put in a closed mould having a volume of 400 cubic centimetres. The mould is placed under water for 30 minutes at 95° C. The homogeneous porous shape obtained has a specific gravity of 0.15 and a high resistance to pressure.

*Example 10*

22,000 parts of water, 80 parts of polyvinyl-pyrrolidone (molecular weight about 300,000), 21 parts of primary sodium pyrophosphate, 2 parts of sodium bicarbonate, 8500 parts of styrene, 60 parts of benzoyl peroxide and 600 parts of petroleum ether having the boiling range 45° C. to 50° C. are run into a stirring autoclave fitted with a blade stirrer. Then, after pressing on nitrogen until a pressure of 7 atmospheres are set up, the autoclave is heated and kept at 82° C. for 30 hours while stirring. The styrene is polymerized to form small beads in which the petroleum ether is contained in a homogeneous distribution.

When the polymerization is complete, the whole is allowed to cool while maintaining the pressure; then the pressure is released and the beads are dried after washing them two times with water at 30° C.

The polystyrene beads which contain petroleum ether are made into porous shapes by foaming them up in water of 98° C. for 15 minutes as in Example 1.

*Example 11*

22,000 parts of water, 85 parts of polyvinyl-pyrrolidone (molecular weight about 250,000), 24 parts of primary sodium pyrophosphate, 18 parts of sodium phosphate, 6500 parts of styrene and 26 parts of benzoyl peroxide are charged in a stirring autoclave. The mixture is kept at 70° C. for 18 hours while stirring, the styrene being thus polymerized to the extent of some 70 to 80 per cent. After cooling, a solution of 2500 parts of styrene, 155 parts of benzoyl peroxide, 570 parts of n-pentane and 45 parts of diethylbenzene is added. Then nitrogen is pressed on until a pressure of 7 atmospheres is set up and after heating to 85° C. polymerization is continued for 20 hours while stirring. The resulting product is then further processed and foamed up as described in Example 10.

*Example 12*

A mixture of 6400 parts of methanol, 2000 parts of bead-shaped polystyrene (molecular weight about 90,000) and 800 parts of petroleum ether having the boiling range 40° C. to 45° C. is stirred at 85° C. for 5 hours in a stirring autoclave in which a nitrogen pressure of 9 atmospheres is set up. The mixture is then cooled and released from pressure. The beads are removed by suction and dried at 30° C.

For making porous shapes the beads are foamed up as described in Example 1.

*Example 13*

6400 parts of methanol, 2000 parts of bead-shaped polystyrene (molecular weight about 180,000), 800 parts of petroleum ether having the boiling range 40° C. to 50° C. and 60 parts of ethylbenzene are stirred at 85° C. for 5 hours in a pressure-resistant stirring autoclave in which a nitrogen pressure of 9 atmospheres prevails. By this treatment the polystyrene absorbs 7 per cent of petroleum ether. After cooling the pressure is released, the beads are nutsched off and dried at 30° C.

For making porous shapes the beads are foamed up as described in Example 1.

Figure 2:
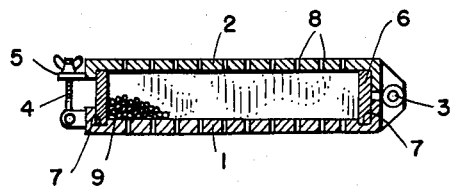
Figure 3:
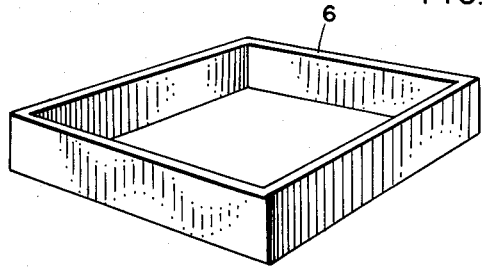

The drawing illustrates the method of the invention wherein comminuted synthetic thermoplastic substances which contain volatile organic liquids in which the substances are insoluble and which boil below the softening points of the substances are heated and expanded in moulds and in contact with a hot fluid, as described above, to form porous articles having the shapes of the moulds. In the drawing, Figure 1 is a plan view of the body of a plate mould in open position;

Figure 2 is a vertical sectional view of the mould in closed position, containing comminuted material to be expanded; and Figure 3 is a perspective view of the frame of the mould, which together with the body of Figure 1 constitutes the mould.

The body of the mould includes two metal plates 1 and 2 connected by hinge joints 3, for opening and closing the mould. A lock fastener 4 which is a wing nut and bolt combination pivotally connected to one plate 1 is provided for engagement with a recessed lock plate 5 projecting from the other plate 2, to lock the mould in closed position. Prior to closing, a frame 6 is inserted in a recess 7 provided in one plate 1, and the body is closed to secure the frame tightly between the plates 1 and 2. In the embodiment illustrated, a number of perforations 8 are provided in the plates 1 and 2, for entry of a fluid heat carrier.

In producing a porous article, a plate in the apparatus shown, a comminuted synthetic thermoplastic substance 9 containing a volatile organic liquid as described above is charged to the mould when open, incompletely filling it, and the mould is closed, as illustrated in Figure 2. An amount of thermoplastic material is employed which will produce an excess pressure on the mould upon expansion, to insure a good union of the individual particles in the resulting shaped article. The closed mould containing the thermoplastic material is immersed in a hot fluid, such as water, steam, glycerine and so forth as described above, to heat the material above its softening point. The organic liquid contained therein then volatilizes, exerting pressure, and causes the particles to expand or foam up and fill the mould, rapidly forming a porous article. The mould is then cooled and opened, and the resulting shaped article is removed. It is true to the size and shape of the mould, having a good proportion-retentivity.

What we claim is:

1. A process for the production of a porous shaped article from a synthetic thermoplastic substance which comprises incompletely filling an enclosing mold having a cavity of the desired shape with a minor proportion of the mold volume of a finely divided synthetic thermoplastic substance containing a volatile organic liquid absorbed therein and homogeneously dispersed throughout the particles thereof, said thermoplastic substance being insoluble in said liquid and said liquid having a boiling point lower than the softening point of the thermoplastic substance, said proportion of said thermoplastic substance when expanded being sufficient to fill said mold, said mold permitting the escape of gases but being capable of retaining the thermoplastic substance, and heating said liquid-containing thermoplastic substance to a temperature above the boiling point of the liquid and above the softening point of the thermoplastic substance to such a degree as to cause the latter to expand and fill the mold and to thereby form a porous article of cohered expanded particles of said thermoplastic substance having the desired shape in said mold.

2. A process as defined in claim 1 wherein the mold is perforated and the heating is effected by immersing the mold in a hot liquid in which the thermoplastic substance is insoluble.

3. A process for the production of a porous shaped article from polystyrene which comprises incompletely filling a perforate enclosing mold having a cavity of the desired shape with a minor proportion of the mold volume of finely divided polystyrene containing a volatile organic liquid absorbed therein and homogeneously dispersed throughout the particles thereof, said polystyrene being insoluble in said liquid and said liquid having a boiling point lower than the softening point of the polystyrene, said proportion of said polystyrene when expanded being sufficient to fill said mold, and heating said liquid-containing polystyrene to a temperature above the boiling point of the liquid and above the softening point of the polystyrene to such a degree as to cause the latter to expand and fill the mold and to thereby form a porous article of cohered expanded particles of polystyrene having the desired shape.

4. A process as defined in claim 3 wherein the heating is effected by immersing the mold in hot water.

5. A process as defined in claim 3 wherein the heating is effected with steam.

6. A process as claimed in claim 3 in which said polystyrene containing said volatile organic liquid dispersed throughout is obtained by bead polymerization of styrene in the presence of said liquid.

7. A process as claimed in claim 3 in which said polystyrene containing said volatile organic liquid dispersed throughout is obtained by bead polymerization of styrene in an aqueous suspension and in the presence of said liquid.

8. A process as claimed in claim 3 in which said polystyrene containing said volatile organic liquid dispersed throughout is obtained by impregnating beads of polystyrene with the said liquid.

9. A process for the production of a porous shaped article from polystyrene which comprises incompletely filling an enclosing mold having a cavity of the desired shape with a minor proportion of the mold volume of finely divided polystyrene containing a volatile liquid hydrocarbon in which the polystyrene is insoluble absorbed therein and homogeneously dispersed throughout the particles thereof, said hydrocarbon having a boiling point lower than the softening point of the polystyrene, said proportion of said polystyrene when expanded being sufficient to fill said mold, said mold permitting the escape of gases but capable of retaining the polystyrene, and heating said hydrocarbon-containing polystyrene to a temperature above the boiling point of the hydrocarbon and above the softening point of the polystyrene to such a degree as to cause the latter to expand and fill the mold and to thereby form a porous article of cohered expanded particles of polystyrene having the desired shape in said mold.

10. A process as defined in claim 9 wherein the volatile liquid hydrocarbon is selected from the class consisting of pentane, hexane, heptane, cyclopentane, cyclohexane, cyclopentadiene and petrol ether boiling within the range of about 30° C. to 70° C.

11. A process as defined in claim 9 wherein the volatile liquid hydrocarbon is petrol ether boiling within the range of about 30° C. to 70° C.

(References on following page)

References Cited in the file of this patent

UNITED STATES PATENTS

| | | |
|---|---|---|
| 1,534,654 | Netz et al. | Apr. 21, 1925 |
| 2,200,847 | Madge et al. | May 14, 1940 |
| 2,256,483 | Johnston | Sept. 23, 1941 |
| 2,268,160 | Miles | Dec. 30, 1941 |
| 2,363,051 | Dosmann | Nov. 21, 1944 |
| 2,409,910 | Stober | Oct. 22, 1946 |
| 2,442,940 | Staudinger et al. | June 8, 1948 |
| 2,602,193 | Korkatti | July 8, 1952 |
| 2,681,321 | Stastny et al. | June 15, 1954 |